US008095713B2

(12) United States Patent
Minoo et al.

(10) Patent No.: US 8,095,713 B2
(45) Date of Patent: Jan. 10, 2012

(54) SMART CABLES

(75) Inventors: Jahan Minoo, South San Francisco, CA (US); Scott Krueger, San Francisco, CA (US); Jesse L. Dorogusker, Los Altos, CA (US); Jay Laefer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 964 days.

(21) Appl. No.: 12/030,429

(22) Filed: Feb. 13, 2008

(65) Prior Publication Data

US 2009/0061678 A1 Mar. 5, 2009

Related U.S. Application Data

(60) Provisional application No. 60/969,946, filed on Sep. 4, 2007.

(51) Int. Cl.
*G06F 13/00* (2006.01)
*H01R 11/00* (2006.01)

(52) U.S. Cl. ........................................ 710/104; 439/502
(58) Field of Classification Search .................. 710/104; 439/502; 713/150–185
See application file for complete search history.

(56) References Cited

U.S. PATENT DOCUMENTS

| 4,850,899 | A | 7/1989 | Maynard |
| 5,055,069 | A | 10/1991 | Townsend et al. |
| 5,080,603 | A | 1/1992 | Mouissie |
| 5,104,243 | A | 4/1992 | Harding |
| 5,108,313 | A | 4/1992 | Adams |
| 5,186,646 | A | 2/1993 | Pederson |
| 5,277,624 | A | 1/1994 | Champion |
| 5,586,893 | A | 12/1996 | Mosquera |
| 5,660,558 | A | 8/1997 | Osanai et al. |
| 5,664,229 | A * | 9/1997 | Bhargava et al. ............... 710/65 |
| 5,697,817 | A | 12/1997 | Bouchan et al. |
| 5,830,001 | A | 11/1998 | Kinoshita |
| 5,901,049 | A | 5/1999 | Schmidt et al. |
| 5,975,957 | A | 11/1999 | Noda et al. |

(Continued)

FOREIGN PATENT DOCUMENTS

JP    7-176351 A    7/1995

(Continued)

OTHER PUBLICATIONS

Derman, Glenda; "Monitors Make Net Connections"; 1996, *Electronic Engineering Times*, vol. 933, pp. 60 and 69.

(Continued)

*Primary Examiner* — Paul R Myers
*Assistant Examiner* — Christopher A Daley
(74) *Attorney, Agent, or Firm* — Kilpatrick Townsend & Stockton LLP (57) ABSTRACT

A smart cable apparatus includes resources that provide for additional functionality such as cable authentication and cable identification. The cable apparatus can be configured for coupling an electronic device such as a media player to other electronic devices such as media player accessories. The cable apparatus includes one or more processing components that can be integrated as part of the cable apparatus. The one or more processing components can be configured to identify the type of signal the cable apparatus is intended to carry, and to communicate that information to the electronic device to which it is connected. The one or more processing components can also be configured to process authentication inquires to indicate whether the cable apparatus is an authorized accessory for the electronic device.

36 Claims, 7 Drawing Sheets

U.S. PATENT DOCUMENTS

| | | | |
|---|---|---|---|
| 6,053,773 | A | 4/2000 | Wu |
| 6,054,846 | A | 4/2000 | Castleman |
| 6,116,943 | A | 9/2000 | Ferrill et al. |
| 6,131,125 | A | 10/2000 | Rostoker et al. |
| 6,154,798 | A | 11/2000 | Lin et al. |
| 6,203,345 | B1 | 3/2001 | Roque et al. |
| 6,206,480 | B1 | 3/2001 | Thompson |
| 6,218,930 | B1 | 4/2001 | Katzenberg et al. |
| 6,267,623 | B1 | 7/2001 | Hisamatsu |
| 6,319,061 | B1 | 11/2001 | Chen et al. |
| 6,322,396 | B1 | 11/2001 | Kuan |
| 6,344,727 | B1 | 2/2002 | Desai et al. |
| 6,354,713 | B1 | 3/2002 | Leifer et al. |
| 6,358,089 | B1 | 3/2002 | Kuroda et al. |
| 6,370,603 | B1 | 4/2002 | Silverman |
| 6,431,915 | B1 | 8/2002 | Ko |
| 6,454,592 | B2 | 9/2002 | Takagi |
| 6,461,173 | B1 | 10/2002 | Mizuno et al. |
| 6,464,542 | B1 | 10/2002 | Lee |
| 6,468,110 | B2 | 10/2002 | Fujino et al. |
| 6,478,603 | B1 | 11/2002 | Wu |
| 6,485,328 | B1 | 11/2002 | Wu |
| 6,498,890 | B1 | 12/2002 | Kimminau |
| 6,524,119 | B2 | 2/2003 | Kato et al. |
| 6,577,877 | B1 | 6/2003 | Charlier et al. |
| 6,585,540 | B2 | 7/2003 | Gutierrez et al. |
| 6,591,085 | B1 | 7/2003 | Grady |
| 6,607,397 | B1 | 8/2003 | Zhang et al. |
| 6,608,264 | B1 | 8/2003 | Fouladpour |
| 6,616,473 | B2 | 9/2003 | Kamata et al. |
| 6,619,986 | B1 | 9/2003 | Yeh |
| 6,648,652 | B2 | 11/2003 | Nakano et al. |
| 6,653,813 | B2 | 11/2003 | Khatri |
| 6,654,840 | B1 | 11/2003 | Gendo et al. |
| 6,725,282 | B1 * | 4/2004 | Grzybowski et al. ............ 710/2 |
| 6,728,546 | B1 | 4/2004 | Peterson et al. |
| 6,776,626 | B2 | 8/2004 | Huang et al. |
| 6,776,665 | B2 | 8/2004 | Huang |
| 6,813,528 | B1 | 11/2004 | Yang |
| 6,816,376 | B2 | 11/2004 | Bright et al. |
| 6,840,807 | B2 | 1/2005 | Ooya et al. |
| 6,859,854 | B2 | 2/2005 | Kwong |
| 6,953,362 | B2 | 10/2005 | Mossner et al. |
| 6,987,319 | B1 | 1/2006 | Paek et al. |
| 7,004,787 | B2 | 2/2006 | Milan |
| 7,151,820 | B2 * | 12/2006 | Vejlgaard ........................ 379/52 |
| 7,269,673 | B2 | 9/2007 | Kim et al. |
| 7,426,585 | B1 * | 9/2008 | Rourke ............................ 710/8 |
| 7,500,032 | B2 * | 3/2009 | Kim et al. ...................... 710/72 |
| 7,549,008 | B2 | 6/2009 | Kalayjian |
| 7,811,119 | B2 * | 10/2010 | Caveney et al. ............ 439/489 |
| 2002/0010759 | A1 | 1/2002 | Hitson et al. |
| 2002/0029303 | A1 | 3/2002 | Nguyen |
| 2002/0065074 | A1 | 5/2002 | Cohn et al. |
| 2002/0103008 | A1 | 8/2002 | Rahn et al. |
| 2002/0115480 | A1 | 8/2002 | Huang |
| 2002/0151327 | A1 | 10/2002 | Levitt |
| 2002/0156546 | A1 | 10/2002 | Ramaswamy |
| 2003/0008553 | A1 | 1/2003 | Oleynick et al. |
| 2003/0026551 | A1 | 2/2003 | Tan et al. |
| 2003/0053603 | A1 | 3/2003 | Vejlgaard |
| 2003/0067741 | A1 | 4/2003 | Alfonso et al. |
| 2003/0073432 | A1 | 4/2003 | Meade |
| 2004/0082369 | A1 | 4/2004 | Dayan et al. |
| 2004/0090998 | A1 | 5/2004 | Chen |
| 2004/0186935 | A1 | 9/2004 | Bell et al. |
| 2004/0235339 | A1 | 11/2004 | Sato et al. |
| 2005/0014536 | A1 | 1/2005 | Grady |
| 2005/0198502 | A1 * | 9/2005 | Cha et al. ...................... 713/168 |
| 2005/0239333 | A1 | 10/2005 | Watanabe et al. |
| 2006/0156415 | A1 | 7/2006 | Rubinstein |
| 2006/0160429 | A1 | 7/2006 | Dawiedczyk et al. |
| 2006/0259942 | A1 | 11/2006 | Toyama et al. |
| 2007/0073958 | A1 | 3/2007 | Kalayjian |
| 2007/0083905 | A1 | 4/2007 | Lee |
| 2007/0117444 | A1 | 5/2007 | Caveney et al. |
| 2008/0028112 | A1 * | 1/2008 | Kubo et al. ................... 710/104 |
| 2008/0129883 | A1 * | 6/2008 | Hirai et al. ................... 348/730 |

FOREIGN PATENT DOCUMENTS

| | | | |
|---|---|---|---|
| JP | 10-321302 | A | 12/1998 |
| JP | 10-334993 | A | 12/1998 |
| JP | 2000-223215 | A | 8/2000 |
| JP | 2000-223216 | A | 8/2000 |
| JP | 2000-223218 | A | 8/2000 |
| JP | 2001-35603 | A | 2/2001 |
| JP | 2001-196133 | A | 7/2001 |
| JP | 2001-230021 | A | 8/2001 |
| JP | 2001-332350 | A | 11/2001 |
| JP | 2002-025720 | A | 1/2002 |
| JP | 2002-203641 | A | 7/2002 |
| JP | 2003-017165 | A | 1/2003 |
| JP | 2003-29888 | A | 1/2003 |
| JP | 2004-240531 | A | 8/2004 |
| JP | 2005-136980 | A | 5/2005 |
| JP | 2006-164706 | A | 6/2006 |
| WO | WO 2004/001552 | A | 12/2004 |

OTHER PUBLICATIONS

Lewis, Peter; "On Technology"; 2002, *Fortune Magazine*, pp. 240.

"iPodDock/iPod Cradle"; www.bookendz/dock_cradle.htm, downloaded Feb. 27, 2003, 2 pages.

"Neuros MP3 Digital Audio Computer"; www.neurosaudio.com, downloaded Apr. 9, 2003, 6 pages.

Menezes, A. et al.; "Handbook of Applied Cryptography, Identification and Entity Authentication"; 1997, *CRC Press Series on Discreet Mathematics and its Applications*, pp. 385-424.

Menezes A, et al., "Handbook of Applied Cryptography, Identification and Entity Authentication," *Handbook of Applied Cryptography*; [*CRC Press Series on Discrete Mathematics and its Applications*], 1997, XP-002262234, pp. 385-424, CRC Press LLC, USA.

United Kingdom Search and Examination Report Dated Nov. 25, 2008 for related United Kingdom Application No. GB0815720.8, filed Aug. 29, 2008.

* cited by examiner

| Pin | Signal Name | I/O | Function |
|---|---|---|---|
| 1 | DGND | GND | Digital ground in mobile device. |
| 2 | DGND | GND | Digital ground in mobile device. |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB Vbus | I | USB power in: used to detect a USB host. |
| 9 | TPB- | I/O | FireWire signal |
| 10 | Accessory Identify | I | Identify external accessory |
| 11 | F/W PWR+ | I | FireWire and charger input power (8 V to 15 V DC) |
| 12 | F/W PWR+ | I | FireWire and charger input power (8 V to 15 DC) |
| 13 | Accessory Power | O | 3.3 V is the nominal output. Nominal current in low power mode is 5 mA. with current limited to 100 mA in high power mode. |
| 14 | Reserved | | |
| 15 | DGND | GND | Digital ground in mobile device. |
| 16 | DGND | GND | Digital ground in mobile device. |
| 17 | Reserved | | |
| 18 | RX | I | Receive data |
| 19 | TX | O | Transmit data |
| 20 | Accessory Detect | I | Accessory Detect |
| 21 | S Video Y | O | Luminance component of S video. |
| 22 | S Video C | O | Chrominance component of S video. |
| 23 | Composite Video | O | Composite signal |
| 24 | Remote Sense | I | Detect remote |
| 25 | LINE-IN L | I | Line level input to the mobile device for the left channel. |
| 26 | LINE-IN R | I | Line level input to the mobile device for the right channel. |
| 27 | LINE-OUT L | O | Line level output to the mobile device for the left channel. |
| 28 | LINE-OUT R | O | Line level output to the mobile device for the right channel. |
| 29 | Audio Return | — | Audio return. This is a signal and should never be grounded inside the accessory. |
| 30 | DGND | GND | Digital ground in mobile device. |
| 31 | Chassis | | Chassis ground for connector shell. |
| 32 | Chassis | | Chassis ground for connector shell. |

Figure 7

SMART CABLES

RELATED APPLICATIONS

The present application is related to commonly-assigned U.S. patent application Ser. No. 11/650,330, titled "Backward Compatible Connector System," by Murphy et al., filed Jan. 5, 2007, which is hereby incorporated by reference in its entirety. The present application claims benefit under 35 USC 119(e) of U.S. Provisional Application No. 60/969,946, filed on Sep. 4, 2007, titled "Smart Cables," the content of which is incorporated herein by reference in its entirety.

FIELD OF INVENTION

The present invention relates in general to electronic cables. More particularly, the invention relates to smart cables that can provide additional functionality such as identification and authentication.

BACKGROUND OF THE INVENTION

The handheld consumer electronic market continues to grow at an extra-ordinary pace, and more of these products provide increasing interconnectivity with other electronic devices. By way of example, electronic products such as mobile phones, personal digital assistants (PDAs), media players, CD players, DVD players, televisions, game players, digital cameras and the like invariably include connectors for making connection to other electronic devices via cables. The different types of connectors may include electrical contacts to carry various types of signals such as digital or analog audio and/or video signals, USB, Firewire, etc.

Examples of media devices with a highly versatile connector system are the iPod and the iPhone manufactured by Apple Inc. of Cupertino, Calif. These media devices may communicate with their accessories and other peripheral devices through one or more cable apparatus. For example, the media devices can send audio signals to a speaker, and/or send video signals to a computer display or television. In order to transmit various kinds of signals, different types of cables may be used. Different cables may have different performance characteristics and may be designed to operate with different communication protocols. Such information often needs to be efficiently communicated to the media devices. Hence it is highly desirable to improve electronic cabling techniques for media devices.

BRIEF SUMMARY OF THE INVENTION

The present invention relates to smart cables that incorporate functionality to provide information such as identification and authentication to devices to which they connect. In various embodiments, a cabling apparatus includes circuitry that can communicate with another device information about the cable including, for example, whether the cable is an authorized cable, what type of cable it is, what type or types of signal(s) it can carry, etc. If the cable is, for example, a composite video or a component video cable connecting a media device to a display, circuitry incorporated in the cable apparatus, according to one embodiment of the present invention, can identify itself and can instruct the media device to supply the display with the appropriate composite or component video signal. The various embodiments of the invention are described in the context of media devices, but it should be recognized that the invention has broader range of applicability.

According to one embodiment of the present invention, a cable apparatus may include a first connector including a housing, a plurality of contacts, and one or more processing components. Additionally, the cable apparatus may include a cable having a first end coupled to the first connector and a second end coupled to one or more second connectors. The one or more second connectors can be configured to connect with one or more electronic devices. The one or more processing components of the cable apparatus can be configured to receive an authentication inquiry from an electronic device through the plurality of contacts, generate an authentication response, and output the authentication response to the electronic device through the plurality of contacts. The authentication response may be associated with whether the cable apparatus is an authorized accessory for the electronic device.

According to another embodiment, a cable apparatus may include a first connector including a housing, a plurality of contacts, and one or more processing components. Additionally, the cable apparatus may include a cable having a first end coupled to the first connector and a second end coupled to one or more second connectors. The one or more second connectors can be configured to be coupled to one or more electronic devices respectively. The one or more processing components can be configured to identify a type of the cable apparatus, generate a cable identification signal, and output the identification signal to the electronic device through the plurality of contacts. The identification signal may be associated with one or more types of signals to be carried by the cable apparatus.

According to another embodiment, a method for operating a cable apparatus includes providing the cable apparatus with circuitry to implement a cable identification process, the cable circuitry to be powered upon connection of the cable apparatus to another electronic device. The method includes the cable circuitry identifying the type of cable and generating a cable identification signal, and the cable circuitry transmitting the cable identification signal to the electronic device. The process of identifying the type of cable may include detecting a signal level on node in the cable circuitry. Alternatively, the process of identifying the type of cable may include transmitting one or more test signals to predetermined contacts coupled to the cable apparatus.

According to another embodiment, a method for operating a cable apparatus includes providing the cable apparatus with circuitry to implement a cable authentication process, the cable circuitry to be powered upon connection of the cable apparatus to another electronic device. The method includes the cable circuitry receiving an authentication request from the electronic device and performing an authentication process. The cable circuitry then generating a cable authentication signal and transmitting the cable identification signal to the electronic device.

According to yet another embodiment, a method of operating a cable apparatus may include receiving an authentication inquiry by a cable apparatus from an electronic device, processing the authentication inquiry by the cable apparatus, sending an authentication response from the cable apparatus to the electronic device, receiving an identification inquiry by the cable apparatus from the electronic device, identifying a cable type for the cable apparatus by the cable apparatus, and sending an identification signal based on at least information associated with the identified cable type. The authentication response can be associated with whether the cable apparatus is an authorized accessory for the electronic device, and the identification signal can be associated with one or more types of signals related to the cable apparatus.

The various features and advantages of the present invention can be more fully appreciated with reference to the detailed description and accompanying drawings that follow.

BRIEF DESCRIPTION OF THE DRAWINGS

FIG. 7 is an example of a list of signals for a connector that may connect to a smart cable according to one embodiment of the presentation.

DETAILED DESCRIPTION OF THE INVENTION

Figure 1:
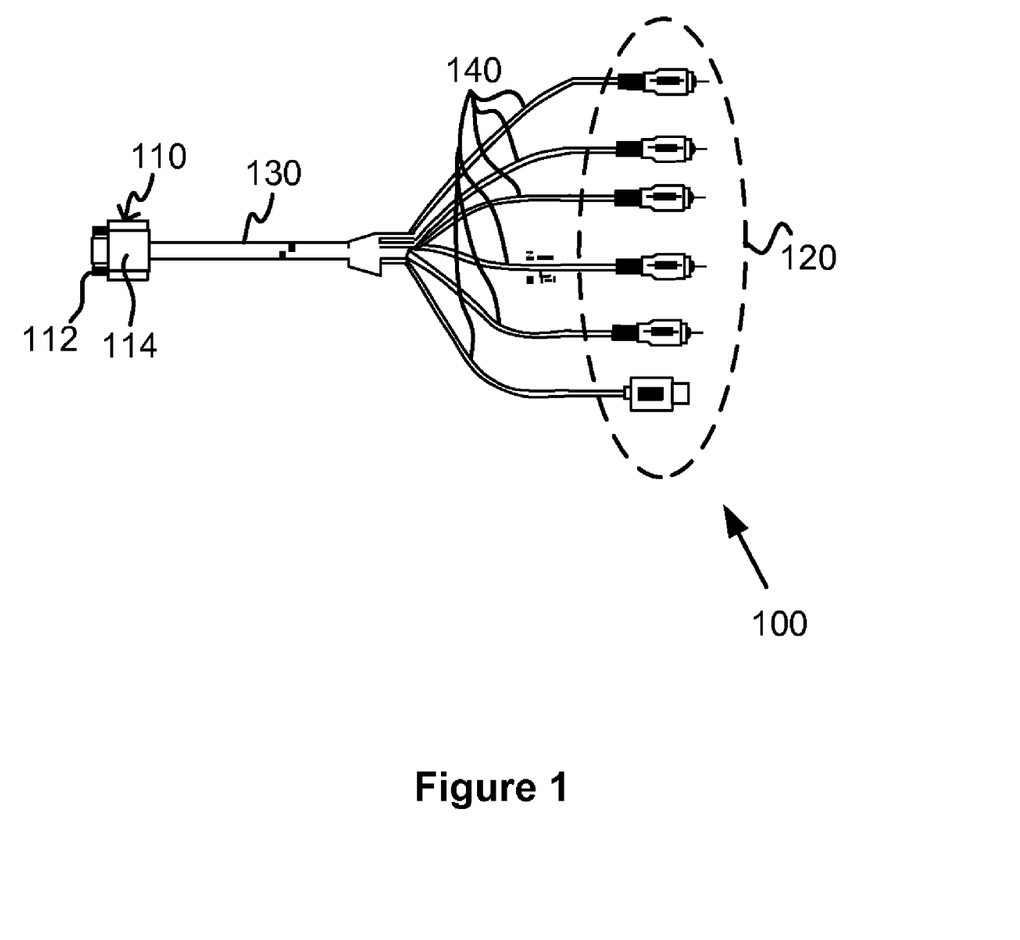
FIG. 1 illustrates a simplified cable apparatus according to an exemplary embodiment of the present invention.

FIG. 1 illustrates a simplified cable apparatus according to an exemplary embodiment of the present invention that is capable of communicating information such as cable identification and authentication upon connection to another device. Cable apparatus 100 may include connector 110 at one end, one or more connector ends 120 at another end, and cable 130 as well as one or more cable lines 140 that couple the connector ends of the cable apparatus. Connector 110 may include contact housing 112 which encloses a plurality of electrical contacts (not shown), and connector boot 114 which houses the assembly that connects wires from the cable lines to the electrical contacts. Within connector boot 114, there can also be electronic components (not shown) that are configured to perform electrical functionality such as cable authentication, cable identification, electrostatic discharge protection and the like. One example of a connector assembly that can integrate such functionality onto, for example, a printed circuit board (PCB) inside the boot of the connector is described in the above-referenced patent application Ser. No. 11/650,330, titled "Backward Compatible Connector System," by Murphy et al., which is hereby incorporated by reference in its entirety.

Plurality of cable lines 140 may be configured to carry a respective plurality of signals, each line connecting to at least one of plurality of connectors 120. By way of example, plurality of connectors 120 may include at least an audio connector, a video connector, and/or a USB connector. If cable system 100 is configured to provide, for example, a composite video cable, the circuitry that may be integrated inside boot 114 of connector 110 can be configured to identify the type of cable and transmit that information (i.e., that the cable is a composite video cable) to the device to which it connects. The device could be, for example, a media device such as an iPod or an iPhone. The media device then automatically provides the appropriate signal, i.e., composite video signal, to the cable. Cable apparatus 100 can provide any one or more of the other types of cables and signals that media devices such as the iPod support, including analog audio, digital (USB) audio, component video, HDMI, DVI, S-video, etc.

Various modifications and variations to cable apparatus 100 are possible. For example, each line 140 may include one or more lines, each of which can independently carry one or more signals. In another example, cable lines 140 may include only one line that is combined with cable 130 to form a single cable. According to some embodiments, one or more additional components may be added to those noted above. Depending upon the embodiment, the specific arrangement of components may be interchanged. Further details of the various arrangements and cabling components can be found throughout the present specification below.

Figure 2:
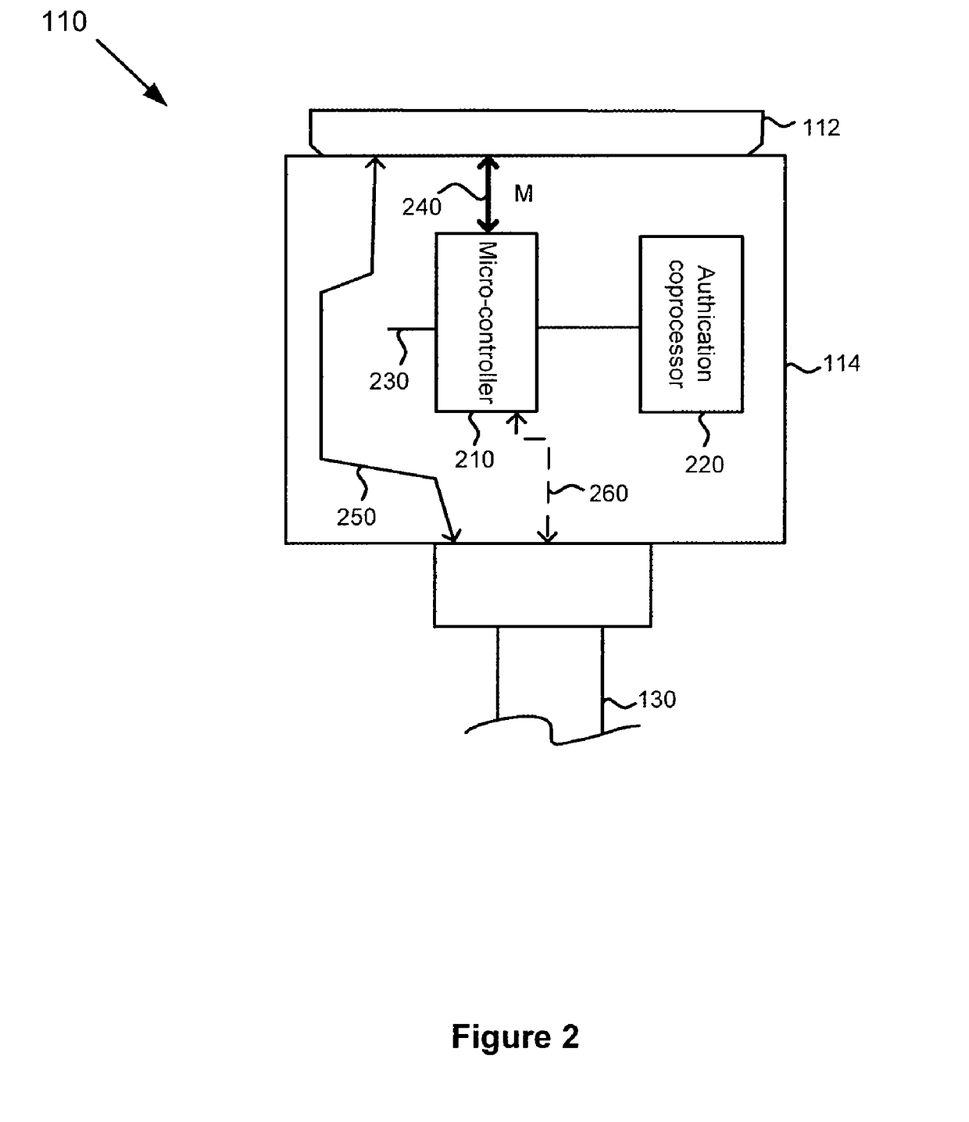
FIG. 2 illustrates a portion of the cable apparatus including circuitry incorporated therein according to another exemplary embodiment of the present invention.

FIG. 2 illustrates a high level block diagram for connector 110 in cable apparatus 100 according to an exemplary embodiment of the present invention. As discussed above, connector 110 may include a contact housing 112 and a connector boot 114. In one embodiment, connector boot 114 houses a PCB (not shown) on which various circuit components can be mounted. The circuit components can include, for example, micro-controller 210, authentication coprocessor 220, and identification wire 230 that may be electrically coupled together via circuit traces on the PCB. An example of the internal construction of connector 100 can be found in the above-referenced patent application Ser. No. 11/650,330, titled "Backward Compatible Connector System," by Murphy et al., in particular in connection with FIG. 10B of that application. While these components are described as being housed inside connector 110, it is possible that parts or all of the components are distributed in other parts of cable apparatus 100. Also, these components may be integrated into a single chip or a plurality of integrated circuits.

As shown in FIG. 2, micro-controller 210, authentication coprocessor 220 and identification wire 230 are coupled together and in combination provide the additional functionality. Micro-controller 210 can be primarily responsible for controlling communication to and from the media device via bus 240. Authentication coprocessor 220 can be primarily responsible for implementing the authentication functionality. And identification wire 230 can be used by micro-controller 210 to detect the type of signal the cable is configured to carry (e.g., component video or composite video). A bus 250 can connect the wires from cable 130 to the contacts (or pins) in contact housing 112. There can be an optional bus 260 directly connecting cable 130 to micro-controller 210. As used herein the term bus refers to any mechanism that electrically connects one set of contact points to another and is not limited to any specific type of electromechanical means.

In operation, when connector 110 is connected to a media device, the media device may send an authentication inquiry to the cable. Micro-controller 210 can receive the authentication inquiry and communicate it to authentication coprocessor 220. Authentication coprocessor 220 then processes the authentication request using an authentication algorithm. The authentication algorithm can be based on, for example, public key encryption using security certificates, digital signatures or other known authentication methodologies. In one embodiment, authentication techniques similar to those described in commonly-assigned U.S. patent application Ser. No. 11/051,499, titled "Accessory Authentication For Electronic Devices," which is hereby incorporated by reference in its entirety, can be implemented by authentication coprocessor 220. The result of the authentication process is communicated from authentication coprocessor 220 to micro-controller 210 and from micro-controller 210 to the media device via bus 240. Upon successful authentication, the media device may proceed with further communication with the cable apparatus. While the block diagram of FIG. 2 shows micro-controller 210 and authentication coprocessor 220 as two separate components, it is possible to integrate both functionalities into a single chip.

Another functionality integrated in and provided by the cable apparatus according to an embodiment of the present invention is cable identification. According to this embodiment, a signal such as a voltage level provided on identification wire 230 indicates a type of cable. The signal on identification wire 230 can, for example, indicate whether the cable is configured to carry, e.g., composite video, component video or S-video signal. The level of the signal on identification wire 230 can be set by, for example, a resistive circuit that may be coupled either to the power supply (i.e., as a pull-up) or to ground (i.e., as a pull-down) or between both to form a voltage divider. It is also possible to not connect identification wire 230 to any signal and instead use a floating condition to also indicate a type of cable. This embodiment envisions that the cable manufacturer sets the signal level on identification wire 230 simplifying the implementation of micro-controller 210. This allows the use of a more cost-effective micro-controller 210 that can be programmed to detect the signal level on identification wire 230. In this embodiment, once micro-controller 210 determines the type of cable it is associated with, it may internally save that information in a register so that it does not have to make that determination each time it is connected to a media device. Once the cable type is identified (and in some embodiments after the cable is authenticated), micro-controller 210 can transmit a request signal to a media device to which it is connected to enable the appropriate (e.g., audio and/or video) outputs in the correct format. While in this example, the type of cable is determined based on voltage level on identification wire 230, it is also possible to accomplish similar functionality with techniques other than voltage level detection, such as current sensing.

Figure 3:
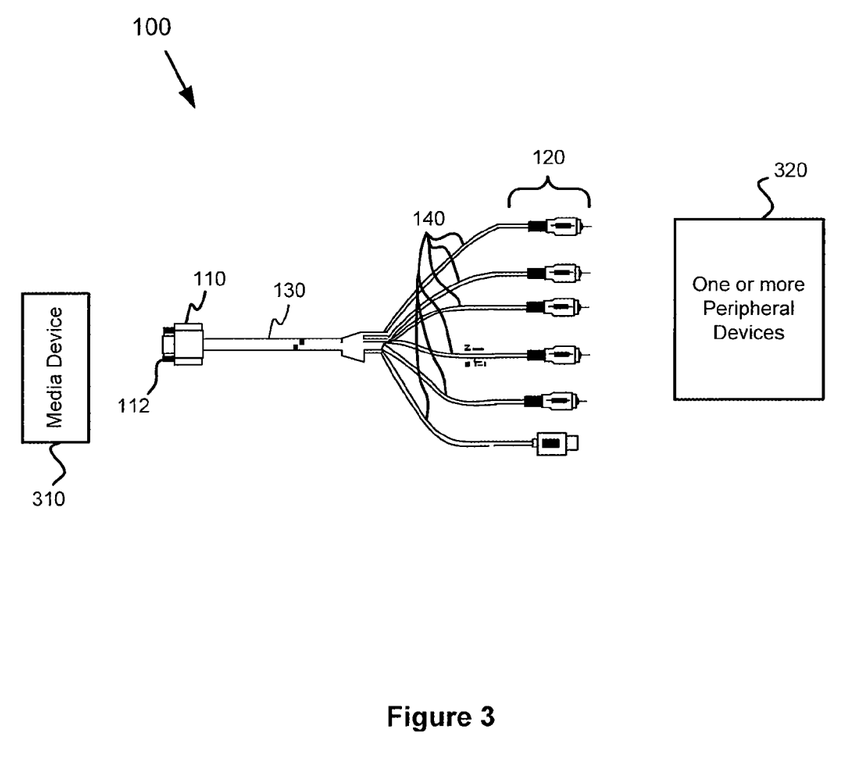
FIG. 3 illustrates the cable apparatus coupled with a media device and one or more peripheral devices according to an exemplary embodiment of the present invention.

In an alternative embodiment, a more sophisticated micro-controller 210 can eliminate the need for identification wire 230 and its associated circuitry by dynamically detecting the type of cable being used. According to this embodiment, micro-controller 210 can be programmed to detect the type of cable upon connection between the media device and an accessory device. FIG. 3 depicts cable apparatus 100 connecting a media device 310 to one or more accessory devices 320. Connector end 110 of cable apparatus 100 connects to media device 310 via contacts 112 while any one or more of connector ends 120 connect to one or more accessory devices 320.

According to this embodiment, micro-controller 210 can test whether a connection is made at the accessory end via any one or more of cables 140. This can be done, for example, by micro-controller 210 applying one or more test signals to pre-determined contact pins 112 that are designated to carry specific signal types when connected by cable apparatus 100 to one or more accessory devices 320. In an alternative embodiment, micro-controller 210 can apply the test signals directly to pre-determined wires in cable 130 via bus 260 (see FIG. 2). Based on the signal(s) returned to micro-controller 210 in response to the test signal(s), the micro-controller can determine how many and which connector end(s) 120 are in fact connected to an accessory. This will enable micro-controller 210 to identify the type of cable being used. For example, if only one connector end 120, such as a male RCA plug for a single composite video cable, is connected, micro-controller 210 will identify the cable as a composite video cable. If, on the other hand, the test indicates connection of three connector ends 120 corresponding to component video signal, then micro-controller 210 identifies the cable as component video cable. It is also possible for micro-controller 210 to determine an erroneous connection (e.g., when only one of the three component connector ends is connected) and signal media device 310 to indicate the erroneous connection on its display. Accordingly, in this embodiment, the cable type is determined by the connection it is providing and therefore can vary from one application to the next. That is, in one application wherein the cable connects a media device to, for example, a video accessory that uses composite video signals, micro-controller 210 will identify the cable type as composite video cable. The same cable when used in another application for connecting a media device to, for example, a video accessory that uses component video will be identified by micro-controller 210 as a component video.

Once the type of cable is determined (and, in some embodiments, after the cable is authenticated), micro-controller 210 can transmit the cable preferences for that particular cable type to the media device. The cable preferences depend on the cable type which can be any one or more of the following: USB, Firewire, analog or digital audio, composite video, component video, S-video, HDMI, DVI and the like. For example, preferences for a composite video cable can be audio line out and composite video.

In one application, cable apparatus 100 may be used to connect a media device such as an iPod to both a television set via video connector ends and a hi-fi speaker system via the audio connector ends. Cable apparatus 100 automatically performs the authentication process upon connection to media device 310. Cable apparatus 100 can also perform the cable identification process upon connection to media device 310 or upon connection to both media device 310 and accessory devices 320. Micro-controller 210 can perform the cable identification task before, after or in parallel with the authentication process.

Figure 4:
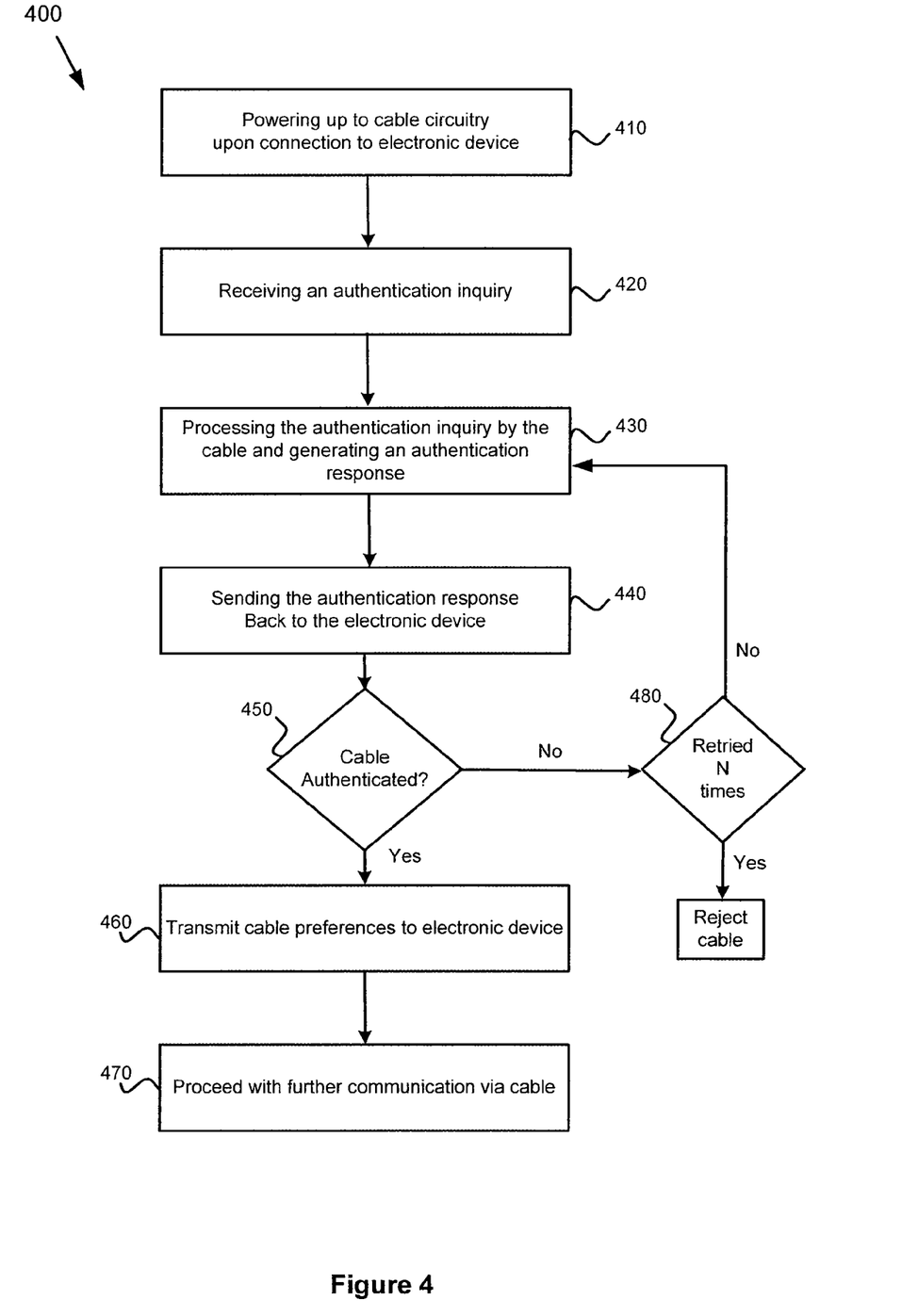
FIGS. 4, 5 and 6 illustrate various methods of operation for the smart cable according to embodiments of the present invention.
Figure 5:
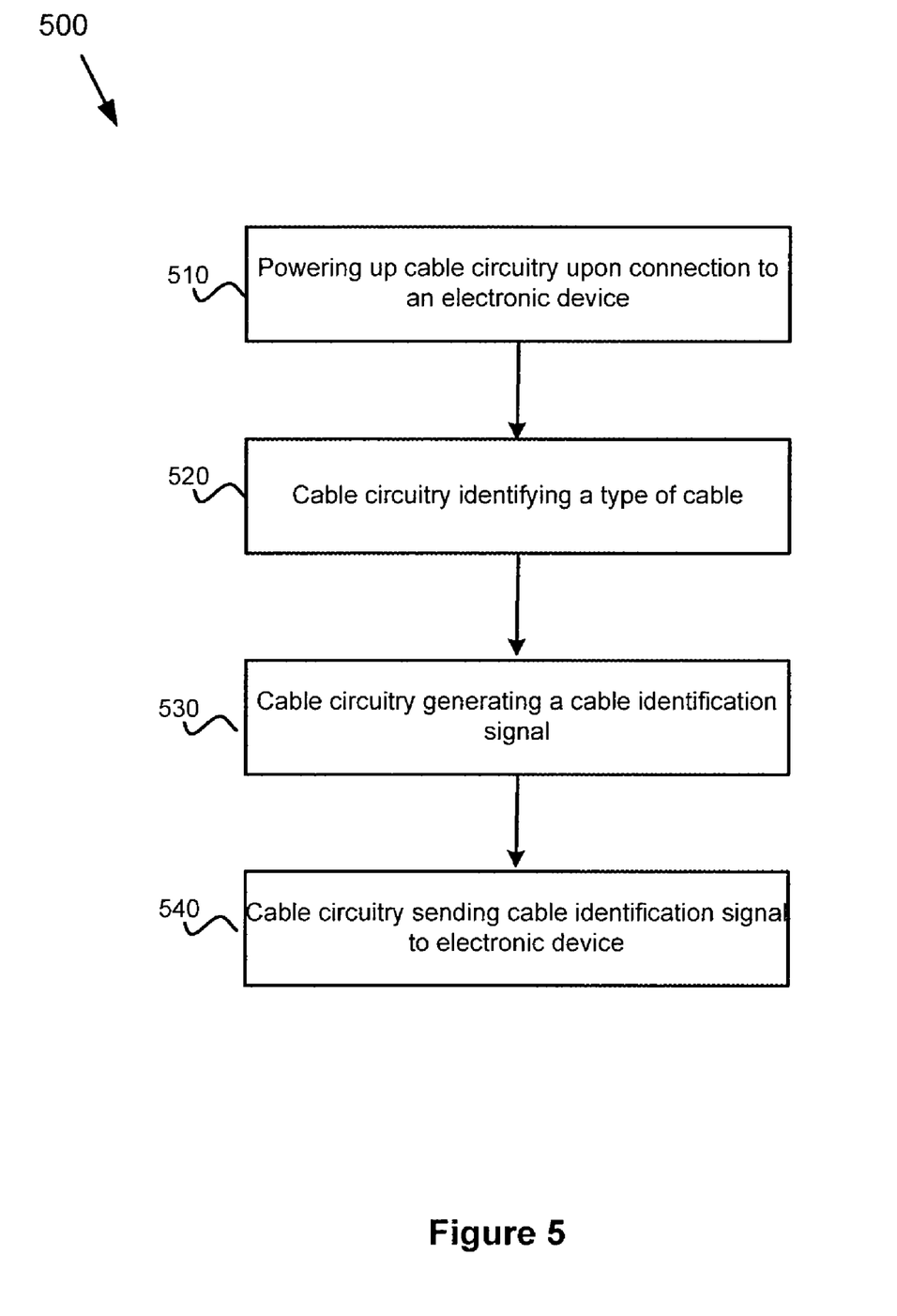
Figure 6:
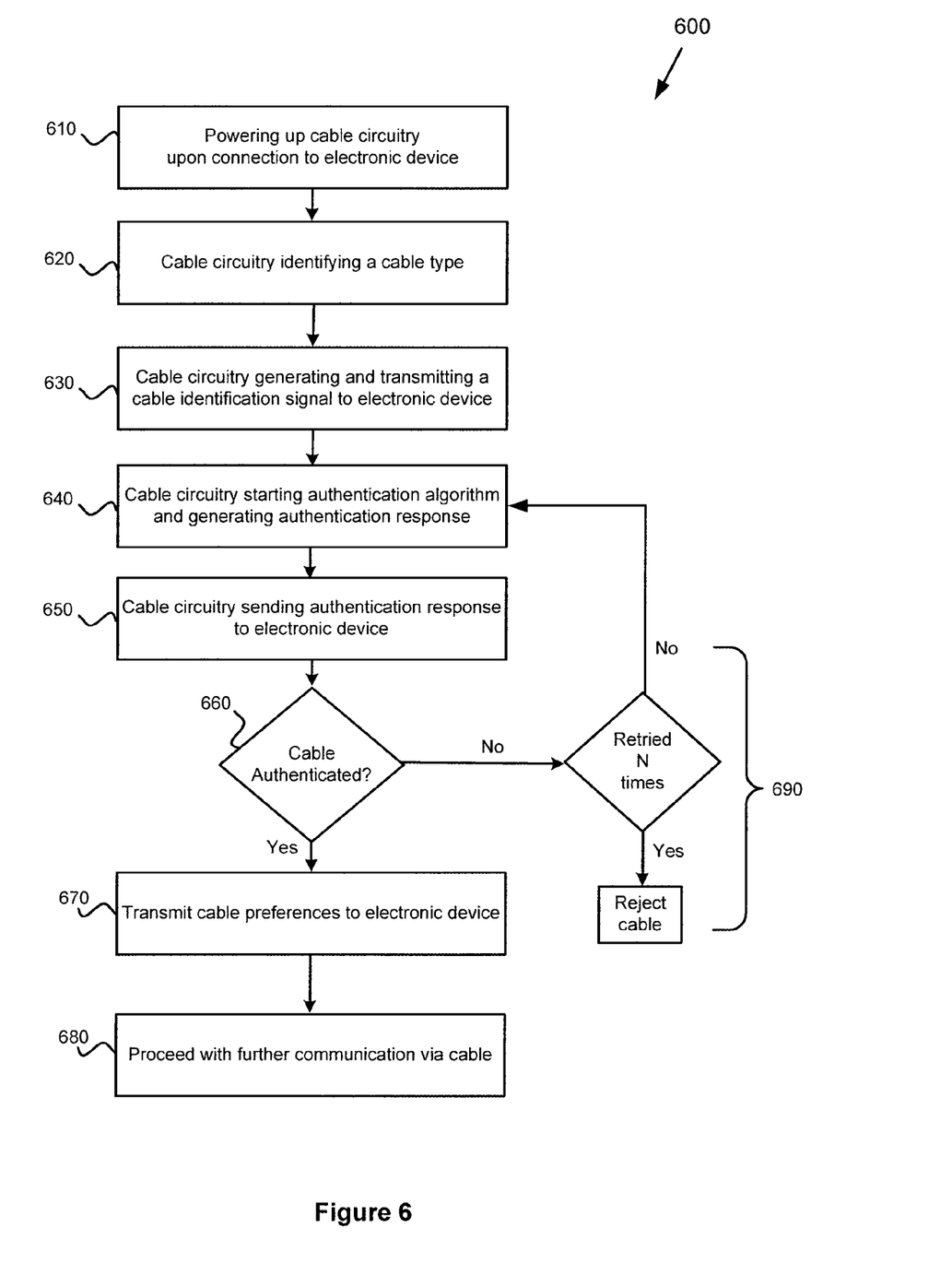

FIGS. 4, 5 and 6 illustrate various simplified methods of operation for the smart cable according to embodiments of the present invention. Method 400 shown in FIG. 4 depicts one authentication method which may include process 410 for powering up the cable circuitry upon connection to an electronic device such as a media player or an accessory. Once powered up, the cable circuitry may receive an authentication inquiry from the media device (process 420). It is also possible that the authentication inquiry sent from the media device to the cable circuitry may be prompted by the cable circuitry itself requesting to be authenticated. In response to the authentication inquiry, the cable circuitry may process the authentication inquiry and generate an authentication response (process 430). The cable circuitry may next send the authentication response back to the media device (process 440). If the authentication response is accepted by the media device (process 450), cable preferences may be transmitted to the media device (process 460) and further communication via the cable apparatus may be authorized (process 470). If the authentication process fails, the cable may be assumed to be unauthorized and no further communication via that cable may be allowed. In one embodiment, the authorization process may be retried one or more times before the cable apparatus is rejected (process 480).

As discussed in connection with FIGS. 2 and 3, these various processes are performed, in one exemplary implementation, by the combination of micro-controller 210 and authentication coprocessor 220. That is, at process 410 upon connecting the cable to media device 320, the internal circuitry of the cable including micro-controller 210 and authentication coprocessor 220 may be powered using, for example, power supplied from media device 320 (or an accessory when connected to an accessory). After power-up, at process 420, micro-controller 210 may receive an authentication request from media device 320. At process 430, micro-controller 210 then communicates with authentication coprocessor 220 to process the request in accordance with the authentication algorithm implemented by coprocessor 220. At process 440, the response generated by authentication coprocessor 220 is then sent back to media device 310 via micro-controller 210.

Accordingly, this method provides for a smart cable that includes all the resources to automatically go through an authentication process upon connection to a media device.

FIG. 5 is a flow diagram depicting method 500 of cable identification according to another embodiment of the present invention. Method 500 may include process 510 for powering up the cable circuitry upon connection to an electronic device such as a media player or an accessory, process 520 for identifying the type of cable, process 530 for generating a cable identification signal, and process 540 for sending the cable identification signal to the media device. As discussed in connection with FIGS. 2 and 3, these various processes are performed, in one exemplary implementation, by micro-controller 210. That is, process 510 may include powering the internal circuitry of the cable including micro-controller 210 and authentication coprocessor 220 upon connecting the cable to media device 320 (or to an accessory) using, for example, power supplied from media device 320. After power-up, process 520 may include micro-controller 210 identifying the cable type. The identification of cable type by process 530 may involve micro-controller 210 detecting a signal level on identification wire 230. Alternatively, micro-controller 210 can detect the cable type by the configuration in which the cable is being used and the type of accessory 320 to which it is connected. Next, process 530 may include micro-controller 210 generating an identification signal and then, process 540 may include sending the identification signal to media device 310. The identification signal may include cable preferences. In response, media device 310 may use the identification signal and automatically start transmitting audio and/or video signals to the cable apparatus 100 according to preferred or required signal formats.

Alternatively, media device 310 may use the identification signal and narrow its displayed menu choices (e.g., showing only the video files that are available in component format). In one example, the identification signal may instruct the media device to transmit audio signals but no video signals to the cable apparatus, and/or may also specify the type of audio signals that is preferred or required by the cable apparatus. In another example, the identification signal may instruct the media device to transmit both audio signals and video signals to the cable apparatus. Additionally, the identification signal may also specify the preferred or required type of audio signals, and/or specify the preferred or required type of video signals. For example, the type of video signal may be composite, component, digital audio, S-video, HDMI, etc. In one embodiment, the type of video signals that is preferred or required by the cable apparatus may be component video signals (e.g., Y, Pb, Pr signals). Accordingly, this method provides for a smart cable that includes all the resources to automatically identify the cable type and send cable preferences to the media device upon connection to the media device.

FIG. 6 is a flow diagram depicting method 600 of cable identification and authentication according to another embodiment of the present invention. Method 600 essentially combines methods 400 and 500 providing for a smart cable that can automatically perform both the identification and authentication processes upon connection to a media device. Referring to FIG. 6, method 600 may include process 610 for powering up the cable circuitry upon connection to a media device (or an accessory). The method may also include process 620 involving the cable circuitry identifying a cable type, and process 630 for the cable circuitry generating and transmitting a cable identification signal to the media device.

Next, in response to a request from the media device to initiate the authentication process, method 600 may also include process 640 whereby the cable circuitry starts the authentication algorithm and generates an authentication response. Process 640 is followed by process 650 which may include sending the authentication response back to the media device. If the cable authentication is successful (process 660), the cable then may send its preferences to the media device (process 670) after which media content may be communicated over the cable (process 680). The cable preferences may include, for example, enabling audio and/or video line out, etc. If authentication fails, method 600 may include process 690 whereby the authentication processes (640 and 650) are repeated a predetermined number of times (n) before rejecting the cable as unauthorized. The details of operation of the authentication process and the cable identification process have been described above in connection with FIGS. 4 and 5 and will not be repeated. It is emphasized here, however, that each of the process flow diagrams depicts an exemplary embodiment and modifications and alternatives are possible. For example, the identification process and or the authentication process may occur with or without an inquiry from the media device. For example, in one embodiment, the process (630) whereby the cable identifies its type to the media device may include the cable also requesting to be authenticated. In response to this request from the cable, the media device may send an authentication request signal to the cable initiating the cable authentication process. Also, the various authentication processes 640 and 650 may occur before, after or concurrently with identification processes 620 and 630.

In one embodiment, the authentication processes 640 and 650 may occur first and, depending on the result of the authentication challenge, the remaining processes may proceed or may be halted. According to this embodiment, if the cable apparatus transmits the expected authentication response, media device 310 may confirm that the coupled cable apparatus is an authorized cable allowing further processes including the cable identification process to continue. If, however, no authentication response is received or if incorrect authentication response is received, the media device may be prevented from transmitting data through the attached cable apparatus, and subsequent processes cannot proceed.

In all of the various embodiments described above, communication between the cable apparatus, the media device and the accessory can be based on any one of a variety of interface protocols. One example of such an interface protocol is the iPod Accessory Protocol developed by Apple Inc. that can facilitate communication between an iPod or iPhone and accessories via a smart cable apparatus according to the present invention. This particular protocol is described in greater detail in commonly assigned U.S. Pat. No. 7,293,122, entitled "Connector Interface System Facilitating Communication Between a Media Player and an Accessory," to Schubert et al., which is hereby incorporated by reference in its entirety. Also, one example of the type of connector suitable for connector 110 over which the above-referenced interface protocol can be communicated is described in the above-referenced patent application Ser. No. 11/650,330, titled "Backward Compatible Connector System," by Murphy et al., which in addition to the PCB inside the boot structure also describes, as shown in FIG. 7, a specific number of pins (e.g., 30) and signal assignments for those pins that facilitate the protocol, all of which is incorporated by reference.

Multiple aspects of the present invention have been described in the context of specific embodiments for illustrative purposes only. Those skilled in the art will appreciate that various alternatives, modifications or changes are possible. The above description should therefore not be limiting of the scope of the present invention, which should instead be determined by the following claims and their full breadth of equivalents.

What is claimed is:

1. A cable apparatus comprising:
a first connector including a housing, a plurality of contacts, and one or more processing components, the plurality of contacts being configured to couple to a first electronic device;
a cable coupled to the first connector; and
one or more second connectors coupled to the cable and configured to couple to one or more second electronic devices;
wherein the one or more processing components comprise a micro-controller and an authentication coprocessor, where the micro-controller is configured to receive an authentication inquiry from the first electronic device through the plurality of contacts and to provide the authentication inquiry to the authentication coprocessor, and wherein the authentication coprocessor is configured to process the authentication inquiry and generate an authentication response, and send the authentication response to the micro-controller, where the micro-controller is further configured to provide the authentication response to the first electronic device through the plurality of contacts.

2. The cable apparatus of claim 1 wherein the micro-controller detects a signal level on an identification wire inside the cable apparatus and identifies a cable type based on the detected signal level on the identification wire.

3. The cable apparatus of claim 2 wherein the identification wire is coupled to a resistor.

4. The cable apparatus of claim 3, wherein the identification wire is not connected to the plurality of contacts, wherein the signal level is a voltage level, and wherein the identification wire is set to have the voltage level.

5. The cable apparatus of claim 2 wherein the identification wire is coupled to a resistor divider.

6. The cable apparatus of claim 5, wherein the signal level is a voltage level between two resistors of the resistor divider.

7. The cable apparatus of claim 1 wherein the authentication processor processes the authentication inquiry using digital signatures.

8. The cable apparatus of claim 1 wherein the authentication processor processes the authentication inquiry using security certificates.

9. The cable apparatus of claim 1 wherein the authentication processor processes the authentication inquiry using public key encryption.

10. The cable apparatus of claim 1 wherein after authentication response is sent to the first electronic device, the first electronic device continues to communicate with the cable apparatus.

11. The cable apparatus of claim 1 wherein the one or more processing components are housed inside a boot of the first connector and electrically couple to one or more of the plurality of contacts.

12. The cable apparatus of claim 1, wherein the authentication coprocessor is configured to generate the authentication response in response to the authentication inquiry, and where the micro-controller is configured to provide the authentication response to the first electronic device before any other authentication responses, the first authentication response allowing the cable apparatus to provide communication with the connector of the first electronic device if the first authentication response is accepted by the first electronic device.

13. A cable apparatus comprising:
a first connector including a housing, a plurality of contacts, and one or more processing components, the plurality of contacts being configured to couple to a first electronic device;
a cable coupled to the first connector; and
one or more second connectors coupled to the cable and configured to couple to one or more second electronic devices;
wherein:
the one or more processing components including a micro-controller, the micro-controller configured to identify a type of the cable apparatus, generate an identification signal, and send the identification signal to the first electronic device through the plurality of contacts, wherein the identification signal identifies what types of signals the cable apparatus can carry.

14. The cable apparatus of claim 13 wherein the micro-controller is coupled to an identification circuit.

15. The cable apparatus of claim 14 wherein the micro-controller is further configured to detect a signal level supplied by the identification circuit and to determine the type of the cable apparatus based at least on the detected signal level.

16. The cable apparatus of claim 15 wherein the signal level supplied by the identification circuit is predetermined.

17. The cable apparatus of claim 13 wherein the micro-controller is configured to determine the type of the cable apparatus based on detecting which of the one or more second connectors are connected to respective one or more second electronic devices.

18. The cable apparatus of claim 13 wherein the types of signals the cable apparatus can carry can be one or more from among a plurality of signal types including composite video, component video, S-video, HDMI or other digital video formats.

19. The cable apparatus of claim 13 wherein the one or more processing components are further configured to receive an authentication inquiry from the first electronic device through the plurality of contacts, to generate an authentication response, and to send the authentication response to the first electronic device through the plurality of contacts.

20. A method of operating a cable apparatus, the method comprising an authentication method comprising:
the cable apparatus receiving an authentication inquiry from an electronic device with a micro-controller;
the micro-controller providing the authentication inquiry to an authentication coprocessor, the authentication coprocessor processing the authentication inquiry;
the authentication coprocessor generating an authentication response that is associated with whether the cable apparatus is an authorized accessory for the electronic device and providing the authentication response to the micro-controller; and
the micro-controller sending the authentication response from the cable apparatus to the electronic device.

21. The method of claim 20 wherein the authentication processor processes the authentication inquiry using digital signatures.

22. The method of claim 20 wherein the authentication processor processes the authentication inquiry using security certificates.

23. The method of claim 20 wherein the authentication processor processes the authentication inquiry using public key encryption.

24. The method of claim 20 further comprising a cable identification method, the cable identification method comprising:
- the micro-controller detecting a signal level on an identification wire inside the cable apparatus;
- the micro-controller identifying a cable type based on the detected signal level on the identification wire; and
- the micro-controller sending to an electronic device, a cable identification signal based at least in part on information associated with the identified cable type,
- wherein, the identification signal is associated with one or more types of signals related to the cable apparatus.

25. The method of claim 24 wherein the identification wire is coupled to a resistor.

26. The method of claim 24 wherein the identification wire is coupled to a resistor divider.

27. The method of claim 24 wherein the cable identification method further comprises the cable apparatus receiving an identification request from the electronic device.

28. A method for identifying a cable apparatus, the method comprising:
- a micro-controller of the cable apparatus detecting a signal level on an identification wire inside the cable apparatus;
- the cable apparatus identifying a cable type based on the detected signal level on the identification wire; and
- the cable apparatus sending to an electronic device, a cable identification signal based at least in part on information associated with the identified cable type,
- wherein, the identification signal is associated with one or more types of signals related to the cable apparatus.

29. The method of claim 28 wherein the identification wire is coupled to a resistor.

30. The method of claim 28 wherein the identification wire is coupled to a resistor divider.

31. The method of claim 28 further comprising the cable apparatus receiving an identification request from the electronic device.

32. A method of identifying types of electronic device coupled to a cable apparatus, the method comprising:
- a micro-controller of the cable apparatus detecting a type of first electronic device to which it is connected through a first connector by applying one or more test signals to one or more pins of the first connector;
- the cable apparatus identifying a cable type based on one or more signals returned in response to the one or more test signals applied to the first connector; and
- the cable apparatus sending to a second electronic device, a cable identification signal based at least in part on information associated with the identified cable type.

33. The method of claim 32 further comprising:
- the cable apparatus detecting a type of second electronic device to which it is connected through a second connector by applying one or more test signals to one or more pins of the second connector;
- the cable apparatus identifying a cable type based on one or more signals returned in response to the one or more test signals applied to the second connector.

34. The method of claim 32 further comprising the cable apparatus receiving an identification request from the second electronic device.

35. A method of operating a cable apparatus, the method comprising:
- an identification method comprising:
  - receiving power from an electronic device; and
  - without receiving a request for a cable identification signal from the electronic device, sending with a micro-controller of the cable apparatus to the electronic device a cable identification signal based at least in part on information associated with an identified cable type;
  - wherein the identification signal is associated with one or more types of signals related to the cable apparatus; and
- an authentication method comprising:
  - the cable apparatus receiving an authentication inquiry from an electronic device;
  - the cable apparatus processing the authentication inquiry with authentication circuitry;
  - the authentication circuitry generating an authentication response that is associated with whether the cable apparatus is an authorized accessory for the electronic device; and
  - the cable apparatus sending the authentication response from the cable apparatus to the electronic device.

36. The method of claim 35, the identification method further comprising:
- the cable apparatus detecting a signal level on an identification wire inside the cable apparatus; and
- the cable apparatus identifying a cable type based on the detected signal level on the identification wire.

* * * * *